Feb. 25, 1964     R. J. LEMIEUX     3,122,597
METHOD OF SEALING JOINTS IN PLASTIC COATED ELECTRICAL CABLES
Filed May 1, 1962
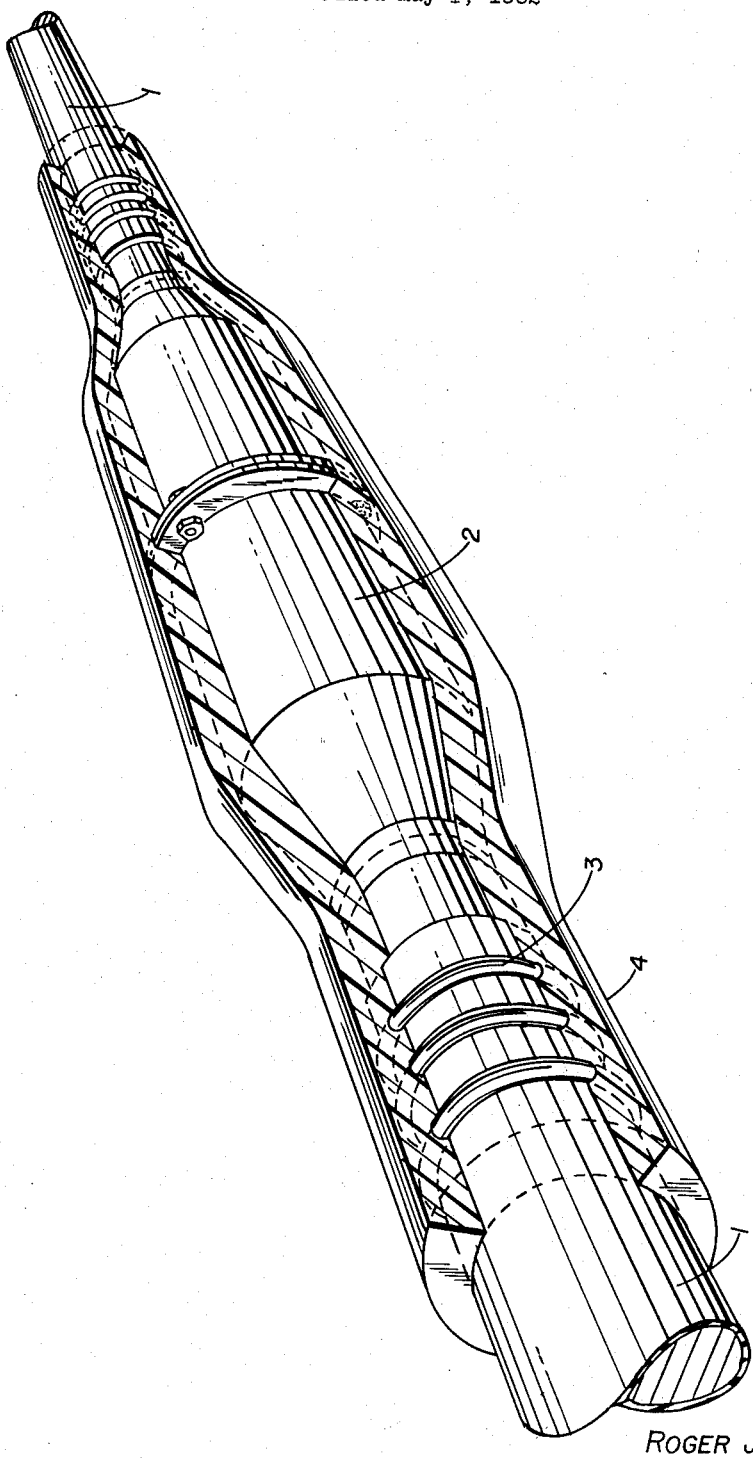
INVENTOR
ROGER J. LEMIEUX
BY- *Smart & Biggar*
ATTORNEYS

3,122,597
METHOD OF SEALING JOINTS IN PLASTIC COATED ELECTRICAL CABLES
Roger J. Lemieux, Lachine, Quebec, Canada, assignor to Northern Electric Company Limited, Montreal, Quebec, Canada
Filed May 1, 1962, Ser. No. 191,622
6 Claims. (Cl. 264—229)

This invention relates to a means for corrosion protecting a joint between two sections of polyolefin jacketed electrical cable.

Fluid-filled electrical cables, e.g. oil-filled cables, are widely used for transmission at high voltages and also for telephone cables. One type of such cable is a paper insulated cable in which the paper insulation is impregnated with a relatively thin gas-free oil which is maintained under pressure by means of reservoirs and fed to the paper by longitudinal channels. Oil-filled cables may also be of the hollow conductor type with the hollow conductor serving as the oil channel. The connection between two sections of an oil-filled cable is usually encased in an oil-filled metal sheath.

Modern oil-filled electrical cables are normally jacketed with a plastic coating, such as a polyolefin, for corrosion protection and protection against moisture. Polyolefins commonly used for this purpose are polyethylene and polyvinylchloride, but other polyolefins can also be used. The joints of such oil-filled cables must have corrosion protection at least equal electrically to that of the corrosion protection of the cable itself, and this is usually achieved by coating the entire joint with a suitable plastic material. A particularly suitable material for this purpose is an epoxy resin e.g. the condensation product of bisphenol A and epichlorohydrin. However, it has been found that it is not possible to obtain a satisfactory seal between the epoxy resin and the polyolefin jacket since the epoxy resin will not adhere to the polyolefin.

I have now discovered that the above difficulty can be overcome by placing at least one natural or synthetic rubber O ring under tension over the polyolefin jacket of each section of cable to be joined adjacent the ends to be joined and then coating the entire joint with an epoxy resin such that the O rings are totally encased between the polyolefin and the epoxy covering. To ensure a perfect seal at each end of the joint, several O rings are preferably used. The epoxy covering can be applied in any convenient manner and is usually cast.

The attached drawing shows a partial section of a typical cable joint according to the invention. In the drawing two sections of polyethylene jacketed oil-filled cable 1 are connected within a metal joint casing 2. Neoprene synthetic rubber O rings 3 of an initial diameter less than that of the polyethylene jacketed cable are stretched over the ends of the polyethylene jacket before the electrical connection is made and after the connection has been made and the metal casing has been closed, an epoxy resin covering 4 is cast over the entire joint. The casting can be conveniently formed by applying a polyethylene mould over the point and O rings and clamping it to the jacketed cable on both sides of the joint. The annular space between the cable and the mould is then completely filled with epoxy resin and allowed to solidify.

By tensioning the O rings, intimate contact is obtained circumferentially between the outer surface of the polyethylene jacket and the inner surface of the ring. The epoxy resin in turn forms an intimate bond with the neoprene rings, with the result that a perfect seal is obtained between the epoxy covering and the polyethylene jacket.

It is an important aspect of this invention that the epoxy resin is moulded over the O rings so that all portions of the rings which are not in contact with the polyolefin jacket are encased in the epoxy resin. The fact that the epoxy resin encases the exposed portions of the rings and adheres to them prevents the O rings from relaxing their initially applied tension, which relaxation would break the seal between the O rings and the cable jacket.

It is most desirable to be able to use an epoxy resin for this purpose since it is not only economical but also has the advantages of having a relatively long pot life, being easily cured in the field and producing a very durable coating. My invention overcomes the only difficulty which has existed in using epoxy resins for coating joints in polyolefin jacketed electrical cables with the result that they can now be used in complete safety as a coating for connections between sections of such cable.

What I claim as my invention is:

1. In a method of corrosion-protecting a joint between two sections of polyolefin-jacketed electrical cable in which the entire joint is coated with an epoxy resin, the steps which comprise placing at least one natural or synthetic rubber O ring under tension over said jacket of each section of cable to be joined, adjacent the ends to be joined, and coating the entire joint with the epoxy resin such that the O rings are totally encased between said jacket and the epoxy coating.

2. The method as claimed in claim 1, wherein the polyolefin is selected from the group consisting of polyethylene and polyvinylchloride.

3. The method as claimed in claim 1 or 2, wherein the O ring is made from a resilient synthetic rubber.

4. The method as claimed in claim 1 or 2, wherein the O ring is made from neoprene.

5. In a method of corrosion-protecting a joint between two sections of polyethylene-jacketed electrical cable in which the entire joint is coated with an epoxy resin, the steps which comprise placing at least one neoprene O ring under tension over the polyethylene jacket of each section of cable to be joined, adjacent the ends to be joined, and coating the entire joint with the epoxy resin such that the O rings are totally encased between the polyethylene jacket and the epoxy coating.

6. The method as claimed in claim 4, wherein the epoxy resin coating is cast around the joint.

References Cited in the file of this patent

UNITED STATES PATENTS

| | | |
|---|---|---|
| 1,037,759 | Haskins | Sept. 3, 1912 |
| 1,606,680 | Wisner | Nov. 9, 1926 |
| 2,460,874 | Coberly | Feb. 8, 1949 |
| 2,504,936 | Payne | Apr. 18, 1950 |
| 2,955,322 | Hite | Oct. 11, 1960 |
| 2,986,411 | Anderson | May 30, 1960 |